US011957945B2

(12) United States Patent
Ehlers et al.

(10) Patent No.: US 11,957,945 B2
(45) Date of Patent: Apr. 16, 2024

(54) FIRE PROTECTION SYSTEMS AND METHODS FOR VENTILATION HOODS

(71) Applicant: Tyco Fire Products LP, Lansdale, PA (US)

(72) Inventors: Joshua L. Ehlers, Marinette, WI (US); William G. White, Traverse City, MI (US)

(*) Notice: Subject to any disclaimer, the term of this patent is extended or adjusted under 35 U.S.C. 154(b) by 254 days.

(21) Appl. No.: 16/594,197

(22) Filed: Oct. 7, 2019

(65) Prior Publication Data

US 2020/0030650 A1 Jan. 30, 2020

Related U.S. Application Data

(63) Continuation of application No. 15/551,003, filed as application No. PCT/US2016/018545 on Feb. 18, 2016, now Pat. No. 10,434,345.

(Continued)

(51) Int. Cl.
*A62C 99/00* (2010.01)
*A62C 3/00* (2006.01)

(Continued)

(52) U.S. Cl.
CPC .......... *A62C 99/0009* (2013.01); *A62C 3/006* (2013.01); *A62C 99/0072* (2013.01);

(Continued)

(58) Field of Classification Search
CPC .... A62C 99/009; A62C 99/0072; A62C 3/006

(Continued)

(56) References Cited

U.S. PATENT DOCUMENTS 3,283,827 A 11/1966 Diehl
3,653,443 A * 4/1972 Dockery ................ F24C 15/20 169/65

(Continued)

FOREIGN PATENT DOCUMENTS

CN 2354593 Y 12/1999
CN 1798517 A 7/2006

(Continued)

OTHER PUBLICATIONS

Core Protection Fire System—Installation, Operation, and Maintenance Manual, document No. A0011052, Rev. 5, CaptiveAire Systems, Raleigh, North Carolina (40 pages) (Sep. 2011).

(Continued)

*Primary Examiner* — Joseph A Greenlund
(74) *Attorney, Agent, or Firm* — Foley & Lardner LLP

(57) ABSTRACT

A ceiling ventilation hood and fire protection system includes a ceiling ventilation hood, the ceiling ventilation hood defining an upper plane and a lower plane with a filter disposed between the upper and lower planes, and at least two nozzles each having an outlet defining a discharge axis with the outlet disposed in the ceiling ventilation hood between the upper and lower planes to provide overlapping protection of a hazard zone. Each of the nozzles define a spray pattern to effectively address a fire within the hazard zone independent of airflow through the filter. The outlets of the at least two nozzles are positioned at least 54 inches above the hazard zone.

20 Claims, 4 Drawing Sheets

Related U.S. Application Data

(60) Provisional application No. 62/149,254, filed on Apr. 17, 2015, provisional application No. 62/117,933, filed on Feb. 18, 2015.

(51) Int. Cl.

| | |
|---|---|
| ***F24F 7/003*** | (2021.01) |
| ***F24F 7/007*** | (2006.01) |
| *B08B 15/02* | (2006.01) |
| *F24C 15/20* | (2006.01) |
| *F24F 7/00* | (2021.01) |
| *F24F 11/33* | (2018.01) |

(52) U.S. Cl.
CPC .............. *F24F 7/003* (2021.01); *F24F 7/007* (2013.01); *B08B 15/02* (2013.01); *F24C 15/2021* (2013.01); *F24F 2007/001* (2013.01); *F24F 11/33* (2018.01)

(58) Field of Classification Search
USPC ............................................................ 169/16
See application file for complete search history.

(56) References Cited

U.S. PATENT DOCUMENTS

| | | | | | |
|---|---|---|---|---|---|
| 3,824,374 | A * | 7/1974 | Mayher | H02H 5/00 | 169/65 |
| 3,889,754 | A * | 6/1975 | Dunn | A62C 3/006 | 169/59 |
| 4,085,735 | A * | 4/1978 | Kaufman | A62C 3/006 | 169/65 |
| 4,524,835 | A * | 6/1985 | Mingrone | A62C 3/006 | 169/65 |
| 4,813,487 | A * | 3/1989 | Mikulec | F24C 15/2021 | 251/74 |
| 4,830,116 | A * | 5/1989 | Walden | A62C 2/04 | 169/17 |
| 4,897,207 | A * | 1/1990 | Greene | A62D 1/0071 | 169/44 |
| 4,979,572 | A * | 12/1990 | Mikulec | A62C 3/006 | 239/524 |
| 5,154,161 | A * | 10/1992 | Rogers | B03C 3/017 | 169/65 |
| 5,287,702 | A * | 2/1994 | Blackshaw | F25B 21/02 | 62/3.2 |
| 5,351,760 | A * | 10/1994 | Tabor., Jr. | A62C 3/006 | 169/59 |
| 5,522,377 | A * | 6/1996 | Fritz | F24C 15/2035 | 126/299 R |
| 5,642,784 | A * | 7/1997 | Guay | F24C 15/2021 | 169/65 |
| 5,839,667 | A * | 11/1998 | Fishcer | B05B 1/265 | 239/498 |
| 6,173,791 | B1 * | 1/2001 | Yen | A62C 3/06 | 169/65 |
| 6,276,461 | B1 * | 8/2001 | Stager | A62C 3/006 | 169/65 |
| 6,293,983 | B1 * | 9/2001 | More | B01D 39/1615 | 55/491 |
| 7,389,827 | B2 * | 6/2008 | Biehl | A62C 31/28 | 169/65 |
| 7,681,655 | B2 * | 3/2010 | Biehl | A47J 27/09 | 169/65 |
| 7,789,165 | B1 * | 9/2010 | Yen | A62C 37/10 | 169/65 |
| 7,963,282 | B2 * | 6/2011 | Griffin | F24C 15/2057 | 454/55 |
| 8,316,839 | B2 * | 11/2012 | Kellogg | F24C 15/2057 | 454/55 |
| 8,378,834 | B1 * | 2/2013 | Glaub | A62C 3/006 | 169/56 |
| 9,205,290 | B2 * | 12/2015 | Magnone | A47J 37/1271 | |
| 9,395,091 | B2 * | 7/2016 | Zank | F24C 15/2021 | |
| 9,494,324 | B2 * | 11/2016 | Livchak | F24F 11/526 | |
| 2006/0272832 | A1 * | 12/2006 | Biehl | A62C 31/02 | 169/65 |
| 2007/0246234 | A1 * | 10/2007 | Vegso | A62C 37/12 | 169/59 |
| 2008/0257568 | A1 * | 10/2008 | Hauzer | A62C 37/40 | 169/65 |
| 2008/0314602 | A1 * | 12/2008 | Lohnes | A62C 13/78 | 169/56 |
| 2009/0194299 | A1 * | 8/2009 | Neumann | A62C 35/68 | 169/65 |
| 2009/0264060 | A1 * | 10/2009 | Livchak | F28C 3/06 | 165/104.31 |
| 2009/0272372 | A1 * | 11/2009 | Griffin | F24C 15/2057 | 169/65 |
| 2010/0101809 | A1 * | 4/2010 | Christensen | A62C 3/006 | 169/65 |
| 2011/0308825 | A1 * | 12/2011 | Lee | F24C 15/2021 | 169/65 |
| 2013/0048319 | A1 * | 2/2013 | Glaub | B01D 47/06 | 169/65 |
| 2013/0092404 | A1 * | 4/2013 | Mikulec | A62C 3/006 | 169/65 |
| 2013/0341053 | A1 * | 12/2013 | Rouse | A62C 35/605 | 169/23 |
| 2014/0020673 | A1 * | 1/2014 | Zank | A62C 37/40 | 169/65 |
| 2014/0305665 | A1 * | 10/2014 | Magnone | A62C 3/006 | 169/45 |
| 2015/0217152 | A1 * | 8/2015 | Magnone | B05B 1/265 | 169/65 |
| 2015/0226439 | A1 * | 8/2015 | Mikulec | A62C 3/006 | 169/65 |
| 2016/0236021 | A1 * | 8/2016 | Ehlers | A62C 35/02 | |
| 2018/0028850 | A1 * | 2/2018 | Ehlers | A62C 99/0009 | |
| 2020/0030650 | A1 * | 1/2020 | Ehlers | F24F 7/007 | |

FOREIGN PATENT DOCUMENTS

| | | | |
|---|---|---|---|
| EP | 1 883 459 | A1 | 3/2014 |
| JP | H09-276433 | | 10/1997 |
| KR | 20140141788 | A | 12/2014 |
| WO | WO-2008/154718 | A1 | 12/2008 |
| WO | WO-2014/145943 | | 9/2014 |
| WO | WO-2016/134188 | A1 | 8/2016 |

OTHER PUBLICATIONS

Excerpt from "Piranha Restaurant Fire Suppression System—Design, Installation, Recharge, and Maintenance Manual," Rev. 6, Tyco Fire Protection Products, Marinette, Wisconsin (4 pages) (Apr. 2, 2013).

Excerpt from "R-102 Restaurant Fire Suppression System—Design, Installation, Recharge and Maintenance Manual," Rev. Various, Ansul Incorporated, Marinette, Wisconsin (3 pages) (Mar. 1, 2007).

Excerpts from "Amerex KP Restaurant Fire Suppression System—Design, Installation, Maintenance & Recharge Manual, No. 12385 Rev. A," available at http://www.firesecurity.gr/Pdf/kp_manual.pdf, Amerex Corporation, Trussville, Alabama (17 pages) (Oct. 2003).

Excerpts from "Piranha Restaurant Fire Suppression System—Design, Installation, Recharge, and Maintenance Manual," Rev. 6, Tyco Fire Protection Products, Marinette, Wisconsin (13 pages) (Apr. 2, 2013).

Excerpts from "R-102 Restaurant Fire Suppression System—Design, Installation, Recharge and Maintenance Manual," Rev. Various, Ansul Incorporated, Marinette, Wisconsin (40 pages) (Mar. 1, 2007).

International Search Report and Written Opinion on PCT/US2016/018545, dated Feb. 6, 2016, 17 pages.

* cited by examiner

FIRE PROTECTION SYSTEMS AND METHODS FOR VENTILATION HOODS

PRIORITY DATA & INCORPORATION BY REFERENCE

The present application is a continuation of U.S. patent application Ser. No. 15/551,003, which is a National Stage Application of PCT/US2016/018545, filed Feb. 18, 2016, which claims the benefit of and priority to U.S. Provisional Application No. 62/117,933, filed Feb. 18, 2015, and U.S. Provisional Application No. 62/149,254, filed Apr. 17, 2015, all of which are incorporated herein by reference in their entireties.

TECHNICAL FIELD

This invention relates to fire protection systems and devices, and more particularly fire suppression systems using nozzles for the protection of kitchens.

BACKGROUND

Known fire suppression systems for kitchens include nozzles suspended from pipes that extend into the kitchen space including into spaces occupied by kitchen personnel or areas subject to grease and other particles. Thus, the suspended nozzles and associated piping can cause one or more of the following problems for maintaining proper operation of both the fire protection and the kitchen functions: (i) be a source of or create a contamination issue or risk; (ii) present a physical obstruction and source of injury for kitchen personnel; (iii) be subject to tampering; (iv) impede work operations within the kitchen; and/or (v) occupy space such that the nozzles and piping can limit the space for cooking appliances. Moreover, the nozzles and associated piping can be aesthetically unpleasant.

Ventilation hoods provide a location beneath which fire protection nozzles can be installed. As used herein, ventilation hoods include ventilated ceilings or ventilation systems with extraction hoods or exhaust hoods, with or without filters. Generally, ventilation hoods include two or more ports or openings through which forced ventilation air is introduced, circulated and exhausted. In many ventilation hoods, filters are provided to filter the exhausted air of grease, fumes or other products from the cooking operations. However, current nozzle installation designs either leave the nozzle still visible below the hood or just above the hood skirt or flange such that the nozzles still present an obstruction to the kitchen functions as previously described. Moreover, it is believed that current installation designs locate the nozzle far below the ventilation filters or other exhaust ports to prevent any ventilation air currents from interfering with the nozzle performance.

SUMMARY OF THE INVENTION

Preferred systems and methods for ceiling ventilation hood and fire protection, as defined herein, are provided. The preferred systems and methods provide for fire protection nozzles within a ventilation hood at heights that minimize or more preferably eliminate the risks of contamination, injury and interference to kitchen operations and personnel. Accordingly, the preferred embodiments provide for a fire protection system in a ventilation ceiling hood that substantially conceals the fire protection nozzles from sight while effectively addressing a fire in a hazard zone below. In one particular preferred aspect, the systems and methods provide for fire protection nozzles proximate or adjacent the ventilation filters or ports within the ceiling ventilation hood that can effectively address a fire independent of any airflow or air currents through the ports and/or filters.

In one preferred embodiment of a ceiling ventilation hood and fire protection system, as defined herein, the system includes a ceiling ventilation hood that defines an upper plane and a lower plane with a filter disposed between the upper and lower planes. At least two nozzles are disposed in the ventilation hood between the upper and lower planes to provide overlapping protection of a hazard zone. Each of the nozzles define a spray pattern to effectively address a fire within the hazard zone independent of airflow through the filter.

In another preferred aspect, a method of appliance fire protection from a ceiling ventilation hood is provided. The ventilation hood defines an upper plane and a lower plane with a filter disposed between the upper and lower planes. The preferred method includes obtaining a fire protection nozzle; and distributing the nozzle for installation in the ceiling ventilation hood between the upper and lower planes to provide overlapping protection of a hazard zone with the nozzle defining a spray pattern to effectively address a fire within the hazard zone independent of airflow through the filter.

In another preferred method of appliance fire protection from a ceiling ventilation hood, the method includes locating a nozzle between the upper and lower planes of the hood and discharging a mist of firefighting fluid from the nozzle independent of airflow through the filter. Although the Summary of the Invention and the preferred systems and methods address the disadvantages of current fire protection nozzles for kitchens with ceiling ventilation hoods, as defined herein, with fire protection nozzles preferably adjacent or proximate a filter or ventilation port of the ventilation hood, it is to be understood that fire protection nozzle arrangements proximate any ventilation port is covered. The Summary of the Invention is provided as a general introduction to some embodiments of the invention, and is not intended to be limiting to any particular configuration or system. It is to be understood that various features and configurations of features described in the Disclosure of the Invention can be combined in any suitable way to form any number of embodiments of the invention. Some additional example embodiments including variations and alternative configurations are provided herein.

DESCRIPTION OF THE DRAWINGS

The accompanying drawings, which are incorporated herein and constitute part of this specification, illustrate exemplary embodiments of the invention and, together with the general description given above and the detailed description given below, serve to explain the features of the exemplary embodiments of the invention.

Like reference symbols in the various drawings indicate like elements.

DETAILED DESCRIPTION

Figure 1:
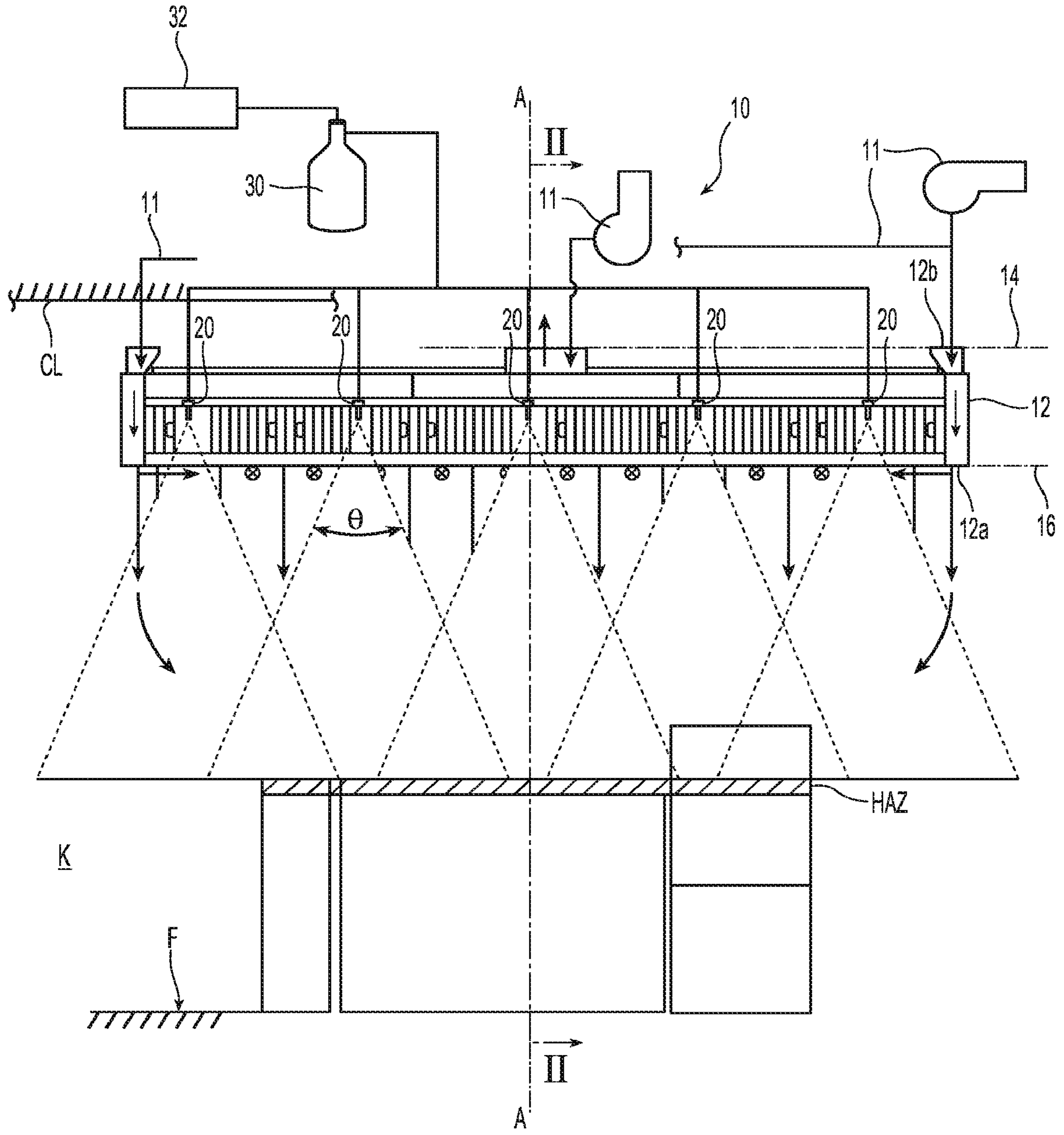
FIG. 1 is a schematic elevation view of a preferred fire protection system in operation.
Figure 2:
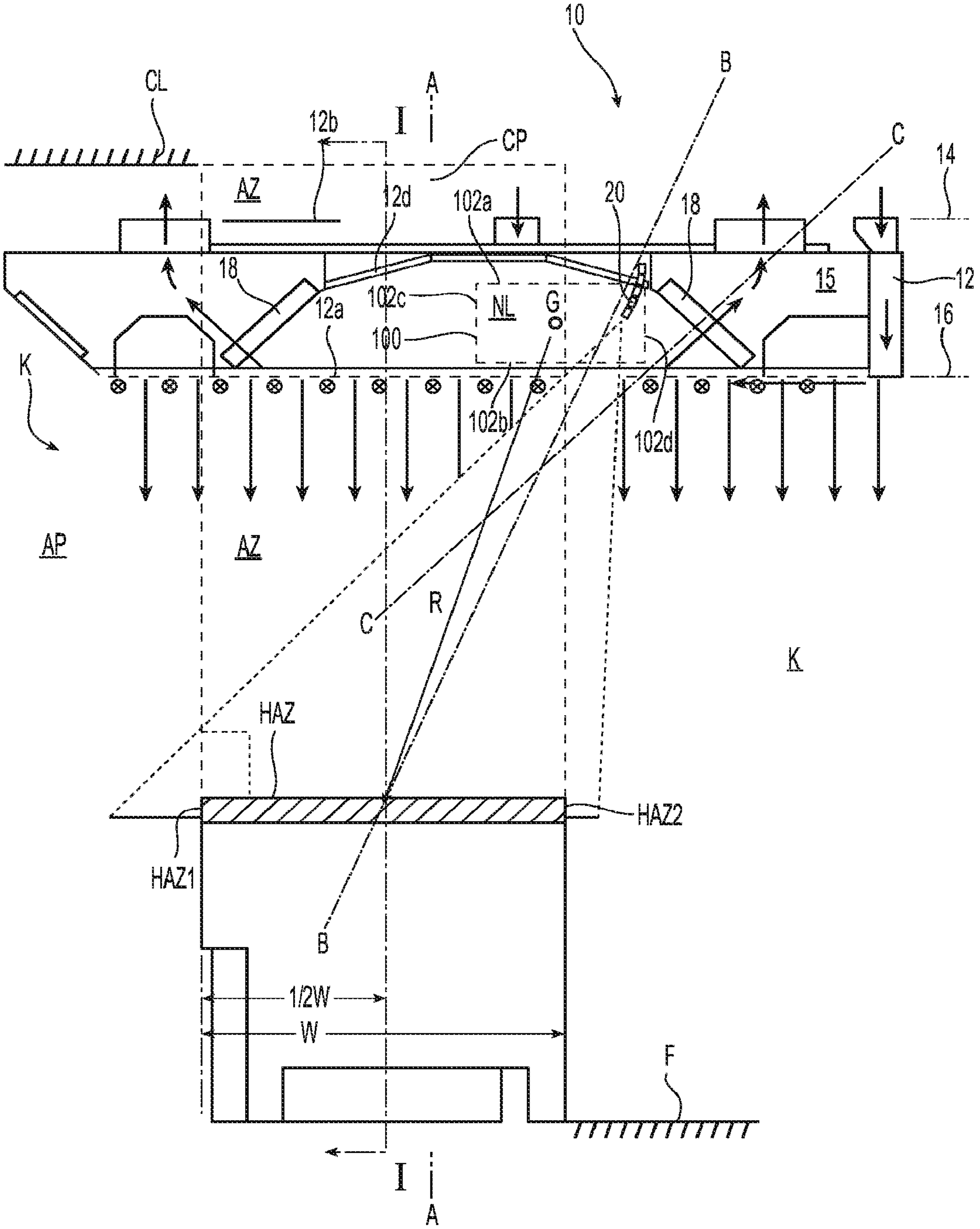
FIG. 2 is a schematic side view of the system of FIG. 1 along line II-II.

Shown in FIGS. 1 and 2 is a schematic illustration of a kitchen space K having a floor F, a ceiling CL with a preferred fire protection system 10 disposed above the floor F with a defined hazard zone HAZ. As used herein, a "hazard zone" HAZ is a theoretical rectangular plane disposed parallel to the floor F that includes all the cooking hazards of one or more appliances, such as, for example, a fryer, burner range, etc., to be protected by a fire protection system 10. Accordingly, the hazard zone HAZ can define the area for location of kitchen appliances. The preferred system 10 includes a ceiling ventilation hood 12 defining an upper plane 14 and a lower plane 16 spaced apart from one another perpendicular to a vertical axis A-A. The lower plane 16 is generally the imaginary plane perpendicular to the vertical axis A-A as defined by the lowest edge, flange or skirt 12*a* of the ventilation hood forming the opening to the hood 12. Disposed within the ceiling ventilation hood 12 between the lower and upper plane 14, 16 are nozzles 20.

As used herein, "ceiling" defines a ventilation hood suitable for installation with its lower plane 16 at a vertical height above the hazard HAZ such that the nozzles 20 are located in a preferred nozzle location zone NL, as described herein, to effectively address a fire in the hazard HAZ. The upper plane 14 is generally an imaginary plane perpendicular to the vertical axis A-A above an uppermost portion of the ventilation hood 12 such as for example one or more ports 12*b* defining either an inlet or outlet port for the independent or combined delivery, circulation or exhaust of forced air, ventilated air, make-up air or exhaust. The ceiling ventilation hood 12 can be framed as either a ventilated ceiling or an exhaust or extraction hood. Accordingly, the upper plane 14 can be an uppermost surface of the duct above an extraction hood through which the ventilated air flows or alternatively, the ceiling CL of the kitchen or building in which the ventilated ceiling is installed. As schematically shown, a ventilation system 11 includes air handler(s) and associated equipment for providing, forcing or pulling make-up air, make-up air curtain and/or ventilated exhaust including, for example, one or more circulating, forced air and/or exhaust blowers, fans, dampers, ducting or piping, etc. In cross-section, the hood 12 defines outer lateral edges 13*a*, 13*b* that extend generally vertically in the direction from the upper plane 14 to the lower plane 16. In a preferred aspect, one or more of the lateral edges of the hood 12 is defined by a lateral duct that conveys forced air from the ventilation system 11.

Figure 2A:
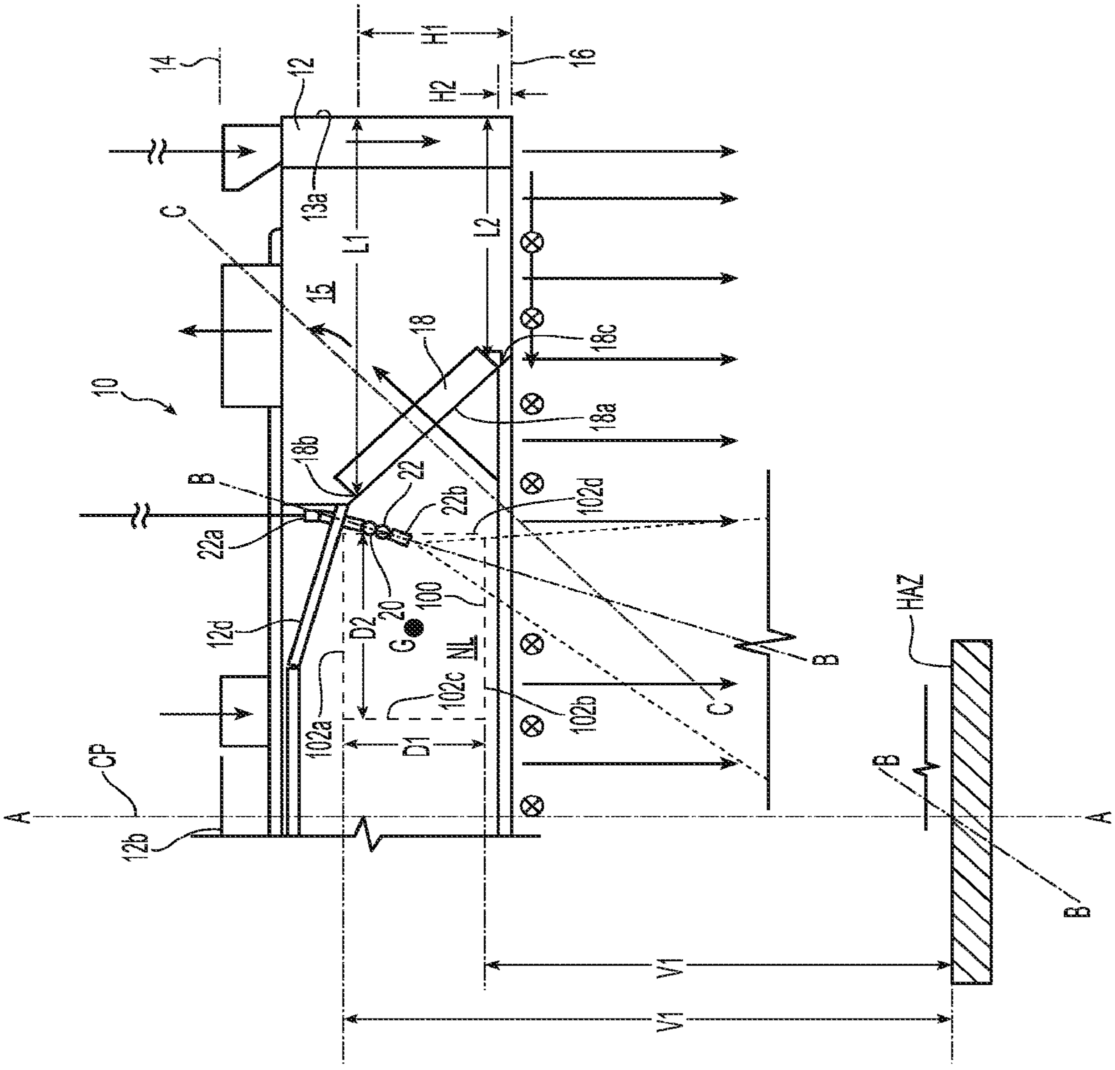
FIG. 2A is a detailed view of the side view of FIG. 2.

In the preferred system 10, one or more fire protection nozzle(s) 20 are located or installed within the ventilation hood 12. Referring to FIG. 2A, the preferred nozzle 20 includes a body 22 having an inlet 22*a* and an outlet 22*b* with an internal passageway (not shown) extending between the inlet and the outlet 22*a*, 22*b* to aligned along nozzles axis B-B of the nozzle 20. More preferably, the fire protection nozzle(s) 20 is located or installed such that its outlet 22*b* is located between the upper and lower planes 14, 16. By preferably locating the nozzle 20 within the hood 12 and nozzle location zone NL, the nozzle 20 is out of sight or way of an occupant within the kitchen K or building in which the hood 12 is installed. As schematically shown in FIG. 1, the nozzle(s) 20 is coupled to a firefighting agent or suppressant 30 and preferably a releasing assembly or mechanism 32 to control the release and delivery of the firefighting agent 30 to the nozzle 20 for effectively addressing a fire. The releasing assembly can be electrically or mechanically controlled and can include automatic or manual actuating devices and associated fire detection equipment that can be mechanically linked or electrically interconnected by hard wired or wireless connections. Preferred embodiments of the system 10 described herein provide for a nozzle installation within the ceiling ventilation hood 12 that can effectively address a fire within the hazard zone HAZ independent of whether or not the ventilation system 11 is on or off.

The nozzle(s) 20 preferably defines a conical spray pattern about the nozzle axis B-B. Preferred embodiments of the systems and methods described herein employ a preferred spray pattern to effectively address and more preferably suppress a fire. To "effectively address" a fire is to apply a firefighting fluid on and/or about the fire to provide satisfactory fire protection and more preferably satisfy the requirements of industry accepted standards, such as for example, National Fire Protection Association ("NFPA") Standards NFPA 96 (2014) and NFPA 17A (2014). The hazard zone HAZ defines the area to be preferably targeted by overlapping nozzle appliance protection. A cooking appliance can completely fill the hazard zone HAZ or a portion thereof. For the purposes herein, "overlapping nozzle appliance protection" is the protection of cooking appliances by nozzles spaced preferably uniformly at uniform elevations. Exemplary characteristics of the spray pattern can be one or more combinations of spray angle about the nozzle axis B-B, a droplet size, a droplet velocity, a spray profile, and/or density. Thus, factors affecting or defining the preferred spray pattern can be any one of working nozzle flow rates and/or fluid delivery pressure or working pressure of the nozzle at its nozzle height within the nozzle location zone NL. Accordingly, there are one or more preferred relationships between the firefighting supply 30, 32 and the preferred nozzle location zone NL described herein. With reference to FIG. 1 and the located nozzle(s) 20, a preferred spray pattern has a spray angle Θ ranging from 29°-46° degrees and more preferably ranging 29°-39° degrees and 36°-46° degrees. Factors affecting the spray pattern can be any one of nozzle flow rate and/or fluid delivery pressure or working pressure of the nozzle. Preferred delivery pressures and flow rates from the nozzle 20 are, for example, 0.5-2.5 gallons per minute (gpm), 1.5-2 gallons per minute (gpm) and more preferably 1.7-1.75 gpm, depending upon the fluid delivery pressure at the inlet 22*a* of the nozzle 20, which can range from 5-150 pounds per square inch (psi.) and more preferably from 10-140 psi and can be any one of 10, 30, 80 or 140 psi. In a preferred aspect, the nozzle 20 delivers a flow of 0.65 gpm for a fluid delivery pressure of 10 pounds per square inch (psi.) to the inlet 22*a* of the nozzle 20 and 2.2 gpm for a fluid delivery pressure of 140 pounds per square inch (psi.). It should be understood that the pressures and/or flow rates can be greater or lower than the preferred ranges provided that the resulting spray pattern provides for the desired overlapping nozzle appliance protection.

An axial plane AP is shown in FIG. 2 which shows a cross-section of the hazard zone HAZ. The hazard zone has a first edge HAZ1 and a second edge HAZ2 spaced from the first edge HAZ1 to define a hazard zone depth or width W in which a cooking hazard of a protected appliance is located. The hazard zone width W can range from 12 inches to 36 inches and can be any one of 30 inches and 34 inches. The hazard zone width W has a midpoint between the first and second edges HAZ1, HAZ2. The hazard zone HAZ defines a vertical projection AZ of the hazard zone into the axial plane AP between the first and second edges HAZ1, HAZ2 of the hazard zone. A central plane CP is disposed perpendicular to the hazard zone HAZ and axial plane and extends through the midpoint of the hazard zone width W parallel to each of the first and second edges HAZ1, HAZ2 so as to bisect the hazard zone HAZ and the vertical projection AZ of the hazard zone.

Nozzle(s) 20 is installed so that its nozzle axis B-B is disposed in the axial plane AP with its outlet 22*b* within the preferred nozzle location zone NL. As used herein, a "nozzle location zone" NL is an area of the axial plane within a closed formed boundary with the nozzle 20 installed such that: (i) the nozzle axis is directed at, and preferably intersects, the intersection of the hazard zone HAZ, the central plane CP and the axial plane AP; and (ii) the nozzle can generate a spray pattern that impacts the hazard zone HAZ and preferably satisfies one or more industry accepted standards for kitchen protection using nozzles.

Figure 3:
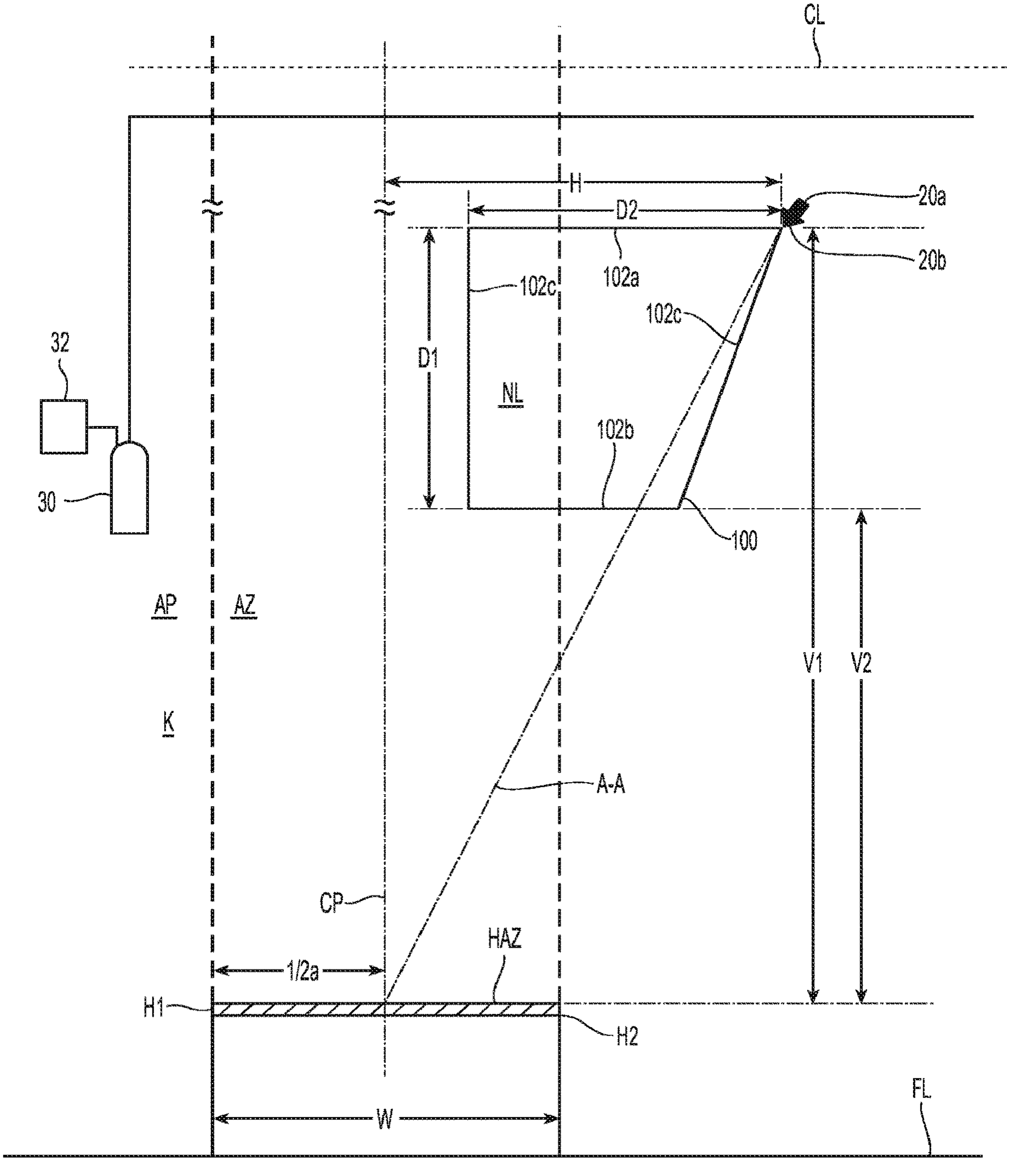
FIG. 3 is a schematic plan view of a nozzle located in one preferred embodiment of a nozzle location zone.

Shown schematically in each of FIG. 2A and FIG. 3 are preferred nozzle location zones. The geometric boundary 100 of the nozzle location zone NL is preferably defined by a plurality of linear edges 102 so as to more particularly define a polygon. Additionally or alternatively, the preferred geometric boundary can be defined by a number of linear edges to approximate a closed form having one or more arcuate edges such as, for example, a circle, ellipse or oval or any other closed form shape. The plurality of linear edges 102 preferably includes a first linear edge 102*a* and a second linear edge 102*b* each extending parallel to the hazard zone HAZ and spaced apart from one another to define a vertical length D1 of the nozzle location zone NL parallel to the central plane CP. The first linear edge 102*a* is the most remote or furthest from the hazard zone HAZ and the second linear edge 102*b* is the most proximate or closest to the hazard zone HAZ. The first linear edge 102*a* is preferably disposed at a preferred maximum distance from the hazard zone HAZ that ranges from about 84 inches to about 99 inches. The second linear edge 102*b* is preferably disposed at a preferred distance from the hazard zone HAZ that can range from a preferred 54 inches to 99 inches and is more preferably at a minimum 54 inches. Accordingly, the first linear edge 102*a* defines a preferred maximum nozzle height V1 and the second linear edge 102*b* defines a minimum nozzle height V2 above the hazard zone. In the preferred embodiment, the first linear edge defines a preferred maximum nozzle height that ranges from about eighty-four inches to about ninety-nine inches (99-84 in.). In a preferred embodiment, the maximum nozzle height is ninety-nine inches (99 in.) and in an alternate embodiment, the maximum height is eighty-four inches (84 in.). The second linear edge 102*b* is preferably disposed at a minimum distance from the hazard zone HAZ to define a minimum nozzle height that that is preferably over fifty inches (50 in.) and is more preferably fifty-four (54 in.). Although an embodiment of the nozzle location zone NL defining such preferred minimum and maximum nozzle heights is applicable to installations for ceiling ventilation hoods, it is to be understood that such a nozzle location zone is applicable to a various of types of other hoods or to any hazard zone installation without a hood. Nozzle location zones more preferably applicable to ceiling ventilations hoods define higher nozzle heights. For example alternatively, the minimum nozzle height can be even greater, such as for example the minimum nozzle height can be sixty-eight inches (68 in.), eight-four inches or greater so long as a nozzle 20 disposed along the second linear edge 102*b* is effective in generating a spray patter to address a fire.

For the preferred nozzle location zone NL and maximum nozzle height ranging from eight-four inches to ninety-nine inches, there is a preferred relationship with the firefighting supply 30, 32 to provide for the effective spray pattern at the increased heights. For example, the nozzle location zone NL and supply 30,32 can define a preferred ratio of outlet maximum nozzle height-to-working fluid pressure that ranges from 9.9:1 to 0.6:1. Alternatively or additionally, the nozzle location zone NL and supply 12 defining a preferred ratio of maximum nozzle height-to-working flow rate from the nozzle that ranges from 155:1 to 38:1.

The nozzle location zone NL further defines a nozzle axis B-B between a nozzle outlet 20*b* and a preferred target of the hazard zone HAZ. For example, a preferred target is at the intersection between the hazard zone and a central plane bisecting the hazard zone along its length. The nozzle 20 is preferably oriented at its nozzle height within the nozzle location zone such that the outlet is directed along the preferred nozzle axis B-B and aimed at the preferred target. Alternate targets in the hazard zone HAZ can be identified to alternatively orient the nozzle 20.

The plurality of linear edges 102 further preferably includes a third linear edge 102*c* and at least a fourth linear edge 102*d* spaced apart from one another to define a horizontal width D2 of the nozzle location zone NL parallel to the hazard plane HAZ. The nozzle location zone NL is spaced or off-set from the central plane CP in the axial plane AP. The third linear edge 102*c* is the most proximate or closest to the hazard zone central plane CP and the fourth linear edge 102*d* is the most remote or furthest from the central plane CP. The third linear edge 102*c* is preferably parallel to the central plane CP. The third linear edge 102*c* defines a preferred offset of 8 inches from the central plane CP and the fourth linear edge 102*d* is preferably disposed from the central plane CP a distance of 34 inches. In one preferred aspect a nozzle location zone NL is substantially trapezoidal, as seen for example in FIG. 3, in which the fourth side 102*d* is angled with respect to the central plane CP.

In a preferred aspect of the nozzle location zone NL, the first edge 102*a* has a length to define a length-to-distance from the hazard zone HAZ of about 0.3:1. In another preferred aspect, the second edge 102*b* is spaced from the first edge 102*a* to define a vertical distance therebetween to define a vertical-distance to-width of the hazard zone ratio of about 0.9:1. The nozzle location zone NL can include additional preferred features and define preferred relationships with the hazard zone HAZ. For example, The preferred closed form of the nozzle location zone NL is a geometric boundary 100 off-set or spaced from the central plane CP having a geometric center G. The geometric center G is preferably positioned at a radius from the midpoint of the hazard zone depth W and its intersection with the central plane CP with the radius being at least two times the hazard zone depth W. In another aspect, the vertical height D1 of the nozzle location zone NL has a preferred length less than the hazard zone depth W. In one preferred relationship, maximum nozzle height V1 is about 2-3 times the vertical length D1 of the nozzle location zone NL with the minimum nozzle height being about 1⅔ to 2 times the vertical length D1 of the nozzle location zone NL.

In yet another preferred aspect, the nozzle location zone NL has a portion that is disposed outside the vertical projection AZ of the hazard zone HAZ. More preferably, approximately ⅔ or (66%) of the nozzle location zone NL is outside the vertical projection AZ. Additionally, where the first edge 102*a* defines a preferably maximum width of the nozzle location zone NL and the second edge 102*b* defines a preferred minimum width of the nozzle location zone NL, the first and second edges 102*a*, 102*b* define a preferred ratio that ranges from about 0.6 to about 0.8. Additionally or alternatively, herein the ratio of nozzle location zone area-to-hazard zone width is about twenty-two square inches (22 $in^2$) of nozzle location zone area per each inch of hazard zone width. The first edge 102*a* can include a point that defines the greatest radial distance of the nozzle location zone NL to the midpoint of the hazard zone HAZ and the second edge 102*b* can include a point defining the smallest radial distance of the nozzle location zone NL to the midpoint of the hazard zone HAZ. In a preferred aspect, a first ratio of the greatest radial distance-to-hazard zone width W is about 2.8:1 and a second ratio of the smallest radial distance-to-hazard zone width W is about 1.7. Accordingly, a third ratio can be defined by the first ratio-to-second ratio to be about 1.65:1;

The preferred nozzle location zone NL can locate the one or more nozzles 20 within or relative to the hood 12 and its components. The hood 12 preferably includes one or more filters 18 or filtering structure for filtering out grease, combustion products, fumes, smoke, odors, heat, and steam from the air. A filter 18 is disposed between the upper and lower planes 14, 16 and is more preferably located within the hood between the lowest edge 12*a* and an upper exhaust outlet 12*b* to define the plenum and more preferably the plenum pod 15 between the upper plane 14 and the filter 18, which is generally the space enclosed by the filters and the portion of the hood 12 above the filters 18. The filters 18 are framed or mounted within the hood 12 to present a filter face 18*a* with a first edge 18*b* defining a first height H1 relative to the lower plane 16 and a second edge 18*c* spaced from the first edge 18*b* to define a normal axis C-C between the first and second edges 18*b*, 18*c* and extending perpendicular to the filter face 18*a*. The second edge defines a second height H2 relative to the lower plane 16.

The filter 18 can be mounted at an angle as shown such that the normal axis C-C defines an acute included angle with respect to the vertical axis A-A or a line parallel to the vertical axis. For example, the filter 18 can be disposed to define an included angle ranging from 30°-45° with respect to the vertical axis A-A. Accordingly, in one preferred aspect the first edge 18*b* is disposed above the second edge 18*c* with respect to the lower plane 16. Thus, the second edge 18*c* preferably defines a second height H2 that is smaller than the first height H1 defined by the first edge 18*b* relative to the lower plane 16. Alternatively, the face 18*a* of the filter 18 can be disposed perpendicular to the vertical axis A-A such that the first and second heights H1, H2 of respective first and second edges 18*b*, 18*c* are the same. The filter 18 is preferably located horizontally within the hood 12 relative to the lateral edges 13*a*, 13*b* of the hood 12. To define the lateral location of the filter 18, the first edge 18*b* can define a first lateral distance L1 with respect to the closest lateral edge 13*a* and the second edge 18*c* defines a second lateral distance L2 with respect to the lateral edge 13*a*. Depending upon the angle of orientation of the filter 18, the first and second edges 18*b*, 18*c* can be located at a distance that ranges from 10-800 inches from the lateral edges 13*a*, 13*b* of the ventilation hood 12.

In a preferred embodiment of the system 10, the nozzle location zone NL locates the nozzle(s) 20 adjacent the filter 18 and the plenum pod 15 defined by the filter. The nozzle 20 can be mounted so as to penetrate a ceiling panel 12*d* of the hood 12. Accordingly, the operation and effectiveness of the nozzle 20 to effectively address a fire is preferably independent of the operation of the ventilation system 11 and airflow through the filter 18. Thus, it is believed that preferred embodiments of the system 10 are unlike prior known kitchen fire protection systems because the fire protection nozzle(s) 20 are located within the hood adjacent or proximate the filters and plenum to address fires beneath the hood and can do so effectively, with operation of the ventilation system 11 on or off and without any resulting air currents negatively impacting fire protection performance.

The nozzle 20 location and its orientation can more preferably be defined relative to one more features of the filter 18 and/or its mounting in the ventilation hood 12. The nozzle 20 can be located with its outlet 22*b* even or level with the lower plane 16 and more preferably between the upper and lower planes 14, 16 of the hood 12. More preferably, as seen for example in FIG. 2A, the nozzle 20 is located with its outlet 22*b* adjacent the filter 18 such that the outlet 22*b* is vertically located even with either one of the first or second edges 18*b*, 18*c* of the filter 18 or between the first and second edges 18*b*, 18*c* of the filter 18 depending upon the orientation of the filter 18. In a preferred aspect, the nozzle 20 can be installed within the hood 12 such that the nozzle outlet 22*b* is located at a vertical height of 0 inches (in.) to about twenty (20 in.) above the lower plane 16. For such an installation, the nozzle outlet 22*b* can be preferably located at a height that is 30%-300% of the first height H1 of the first edge 18*b* of the filter 18 relative to the lower plane 16 of the ventilation hood 12. Laterally, the nozzle outlet 22*b* is preferably located between the first edge 13*a* of the ventilation hood 12 and the central plane CP, preferably between the filter 18 and the central plane CP and more preferably located at a lateral distance from the lateral edge 13*a* that is greater than the first lateral distance L1 defined by the first edge 18*b* of the filter 18 so as to be, for example, 110-200% of the first lateral distance L1 defined by the first edge 18*b* of the filter 18.

For the preferred embodiment shown, the discharge or spray pattern preferably extends into the flow path of the ventilation system. More specifically, the nozzle 20 is preferably disposed adjacent the filter 18 and oriented such that the nozzle axis B-B intersects the normal axis C-C of the filter 18 below the lower plane 16 of the ventilation hood 12. The nozzle 20 can be alternatively located and oriented relative to the filter 18. For example, the nozzle 20 and its outlet 22*b* can be located adjacent the filter such that the outlet 22*b* is at the second height H2 of the second edge of the filter 18 relative to the lower plane 16 and more preferably a relative percentage of the second height H2, such as for example, 50-300% of the second height H2 defined by the second edge 18*c* relative to the lower plane 16. Additionally or alternatively, a nozzle 20 and outlet 22*b* can be located between two filters 18. The outlet 22*b* can be more preferably located so as to be centered between the two filters 18 and vertically positioned at a percentage of the second height H2 of the second edge 18*c* of the filter 18 relative to the lower plane 16 of the ventilation hood 12. Further in the alternative, the nozzle 20 can be oriented such that the discharge axis B-B intersects the normal axis C-C of the filter 18 above the lower plane 16 of the ventilation hood 12 or even further in the alternative, discharge axis B-B diverges from the normal axis C-C of the filter 18 in a direction from the lower plane 16 of the hood 12 toward the hazard zone HAZ.

In a preferred aspect the ceiling ventilation hoods and fire protection systems further provide preferred methods of appliance fire protection of an appliance that includes obtaining a fire protection nozzle 20 and distributing the nozzle for installation in a ceiling ventilation hood 12 between the upper and lower planes 14, 16 to provide preferred overlapping protection of the hazard zone HAZ defined by the appliance. Preferred methods of appliance fire protection include discharging a mist of firefighting fluid from the installed nozzle independent of airflow through the filter and/or air flow ports of the hood 12.

A number of embodiments of the invention have been described. Nevertheless, it will be understood that various modifications may be made without departing from the spirit and scope of the invention. Accordingly, it is intended that the present invention not be limited to the described embodiments, but that it has the full scope defined by the language of the following claims, and equivalents thereof.

What is claimed is:

1. A ceiling ventilation hood and fire protection system comprising:

a ceiling ventilation hood, the ceiling ventilation hood defining an upper plane and a lower plane with a filter disposed between the upper and lower planes; and at least two nozzles mounted on the ceiling ventilation hood and spaced a distance apart, each having an outlet defining a discharge axis, the discharge axis extending towards a center of a hazard zone and intersecting an axis that is perpendicular to the filter at a location vertically beneath the lower plane of the ceiling ventilation hood, wherein the outlet is disposed in the ceiling ventilation hood between the upper and lower planes, the nozzles spaced and oriented at a height relative to the hazard zone to provide overlapping protection of the hazard zone, each of the nozzles defining a spray pattern to effectively address a fire within the hazard zone independent of airflow through the filter, wherein the outlets of the at least two nozzles are positioned at least 54 inches above the hazard zone within a nozzle location zone, and wherein the outlets of the at least two nozzles are located on the same side of the filter; and wherein the hazard zone has a hazard zone width corresponding to a width of a heating element of a kitchen appliance, the nozzle location zone being in an axial plane that extends perpendicular to the hazard zone, a radius between a geometric center of the nozzle location zone and a center of the hazard zone being at least twice the hazard zone width, a first vertical edge of the nozzle location zone being above the hazard zone, and a second vertical edge of the nozzle location zone being offset from the hazard zone, the nozzle location zone entirely disposed between the upper and lower planes of the ceiling ventilation hood, within distal ends of the ceiling ventilation hood, and proximate the filter relative to one of the distal ends of the ceiling ventilation hood.

2. The ceiling ventilation hood and fire protection system of claim 1, wherein the filter has a face with a first edge defining a first height relative to the lower plane and a second edge spaced from the first edge to define a normal axis between the first and second edges extending perpendicular to the face of the filter, the second edge defining a second height relative to the lower plane, the outlet of each of the nozzles being located adjacent the filter.

3. The ceiling ventilation hood and fire protection system of claim 2, wherein the second height of the second edge of the filter relative to the lower plane is smaller than the first height such that the normal axis defines an included angle with respect to a vertical axis extending perpendicular to the upper and lower planes.

4. The ceiling ventilation hood and fire protection system of claim 2, wherein the outlet of at least one of the nozzles is vertically spaced from the lower plane at a height ranging from even with the lower plane to three times the first height of the first edge of the filter relative to the lower plane.

5. The ceiling ventilation hood and fire protection system of claim 2, wherein the outlet of at least one of the nozzles is vertically spaced from the lower plane at a height that is 30-300% of the first height of the first edge of the filter relative to the lower plane.

6. The ceiling ventilation hood and fire protection system of claim 2, wherein the outlet of at least one of the nozzles is vertically spaced from the lower plane at a height that is 30-300% of one of the first and second heights relative to the lower plane.

7. The ceiling ventilation hood and fire protection system of claim 1, wherein the outlet of at least one of the nozzles is laterally offset from a central plane bisecting the hazard zone.

8. The ceiling ventilation hood and fire protection system of claim 7, wherein the outlet of at least one of the nozzles is laterally spaced between the filter and the central plane bisecting the hazard zone.

9. The ceiling ventilation hood and fire protection system of claim 2, wherein the discharge axis of at least one of the nozzles intersects the normal axis of the filter below the lower plane.

10. The ceiling ventilation hood and fire protection system of claim 2, wherein the discharge axis of at least one of the nozzles diverges from the normal axis of the filter below the lower plane.

11. The ceiling ventilation hood and fire protection system of claim 1, further comprising an air handling system for pulling air through the filter and a release assembly for discharging a firefighting agent from the at least two nozzles, the air handling system providing forced air through a duct spaced laterally in the ceiling ventilation hood.

12. The ceiling ventilation hood and fire protection system of claim 1, wherein the ceiling ventilation hood includes a ventilated ceiling.

13. The ceiling ventilation hood and fire protection system of claim 1, wherein the ceiling ventilation hood includes an exhaust hood.

14. The ceiling ventilation hood and fire protection system of claim 1, wherein the spray pattern of at least one of the nozzles has a spray angle about a nozzle axis that ranges between 29-46 degrees and a flow rate of about 1.5-2 gallons per minute (gpm) with a fluid pressure at the at least one of the nozzles ranging between 30-140 psi.

15. The ceiling ventilation hood and fire protection system of claim 1, wherein the outlets of the at least two nozzles are positioned less than 99 inches above the hazard zone.

16. The ceiling ventilation hood and fire protection system of claim 1, wherein the outlets of the at least two nozzles are positioned at least 68 inches above the hazard zone.

17. The ceiling ventilation hood and fire protection system of claim 1, wherein the ceiling ventilation hood defines a plenum between the filter and the upper plane, and wherein the outlets of the at least two nozzles are located outside of the plenum.

18. A ceiling ventilation hood and fire protection system comprising:

a ceiling ventilation hood, the ceiling ventilation hood defining an upper plane and a lower plane with a filter disposed between the upper and lower planes; and at least two nozzles mounted on the ceiling ventilation hood positioned within a nozzle location zone and spaced a distance apart, each having an outlet defining a discharge axis, the discharge axis extending towards a center of a hazard zone and intersecting an axis that is perpendicular to the filter at a location vertically beneath the lower plane of the ceiling ventilation hood, wherein the outlet is disposed in the ceiling ventilation hood between the upper and lower planes, the nozzles spaced and oriented at a height relative to the hazard zone to provide overlapping protection of the hazard zone, each of the nozzles defining a spray pattern to effectively address a fire within the hazard zone independent of airflow through the filter, wherein the outlets of the at least two nozzles are positioned at least 54 inches above the hazard zone;

wherein the spray pattern of at least one of the nozzles has a spray angle about a nozzle axis that ranges between 29-46 degrees and a flow rate of about 1.5-2 gallons per minute (gpm) with a fluid pressure at the at least one of the nozzles ranging between 30-140 psi;

wherein the filter has a face with a first edge defining a first height relative to the lower plane and a second edge spaced from the first edge to define a normal axis between the first and second edges extending perpendicular to the face of the filter, the second edge defining a second height relative to the lower plane, wherein the outlet of at least one of the nozzles is vertically spaced from the lower plane at a height ranging from even with the lower plane to three times the first height of the first edge of the filter relative to the lower plane; and wherein the outlet of at least one of the nozzles is laterally spaced between the filter and a central plane bisecting the hazard zone, and wherein the outlets of the at least two nozzles are located on the same side of the filter;

wherein the hazard zone has a hazard zone width corresponding to a width of a heating element of a kitchen appliance, the nozzle location zone being in an axial plane that extends perpendicular to the hazard zone, a radius between a geometric center of the nozzle location zone and a center of the hazard zone being at least twice the hazard zone width, a first vertical edge of the nozzle location zone being above the hazard zone, and a second vertical edge of the nozzle location zone being offset from the hazard zone, the nozzle location zone entirely disposed between the upper and lower planes of the ceiling ventilation hood, within distal ends of the ventilation hood, and proximate the filter relative to one of the distal ends of the ceiling ventilation hood.

19. The ceiling ventilation hood and fire protection system of claim 18, wherein the ceiling ventilation hood defines a plenum between the filter and the upper plane, and wherein the outlets of the at least two nozzles are located outside of the plenum.

20. A ceiling ventilation hood and fire protection system comprising:

a ceiling ventilation hood, the ceiling ventilation hood defining (a) an upper plane and a lower plane with a filter disposed between the upper and lower planes and (b) a plenum between the filter and the upper plane;

at least two nozzles positioned within a nozzle location zone outside of the plenum mounted on the ceiling ventilation hood and spaced a distance apart, each nozzle having an outlet defining a discharge axis, the discharge axis extending towards a center of a hazard zone and intersecting an axis that is perpendicular to the filter at a location vertically beneath the lower plane of the ceiling ventilation hood, wherein the outlet is disposed in the ceiling ventilation hood between the upper and lower planes, the nozzles spaced and oriented at a height relative to the hazard zone to provide overlapping protection of the hazard zone, each of the nozzles defining a spray pattern to effectively address a fire within the hazard zone independent of airflow through the filter;

an air handling system configured to move air from adjacent the nozzle, through the filter, through the plenum, and out of the ceiling ventilation hood; and a release assembly for discharging a firefighting agent from the at least two nozzles, wherein the outlets of the at least two nozzles are positioned at least 54 inches above the hazard zone and less than 99 inches above the hazard zone;

wherein a face of the filter is angled with respect to the lower plane;

wherein the outlets of the at least two nozzles are vertically offset above the lower plane;

wherein the spray pattern of at least one of the nozzles has a spray angle about a nozzle axis that ranges between 29-39 degrees and a flow rate of about 1.5-2 gallons per minute (gpm) with a fluid pressure at the at least one of the nozzles ranging between 30-140 psi; and wherein the hazard zone has a hazard zone width corresponding to a width of a heating element of a kitchen appliance, the nozzle location zone being in an axial plane that extends perpendicular to the hazard zone, a radius between a geometric center of the nozzle location zone and a center of the hazard zone being at least twice the hazard zone width, a first vertical edge of the nozzle location zone being above the hazard zone, and a second vertical edge of the nozzle location zone being offset from the hazard zone, the nozzle location zone entirely disposed between the upper and lower planes of the ceiling ventilation hood, within distal ends of the ceiling ventilation hood, and proximate the filter relative to one of the distal ends of the ceiling ventilation hood.

* * * * *